Patented July 21, 1931

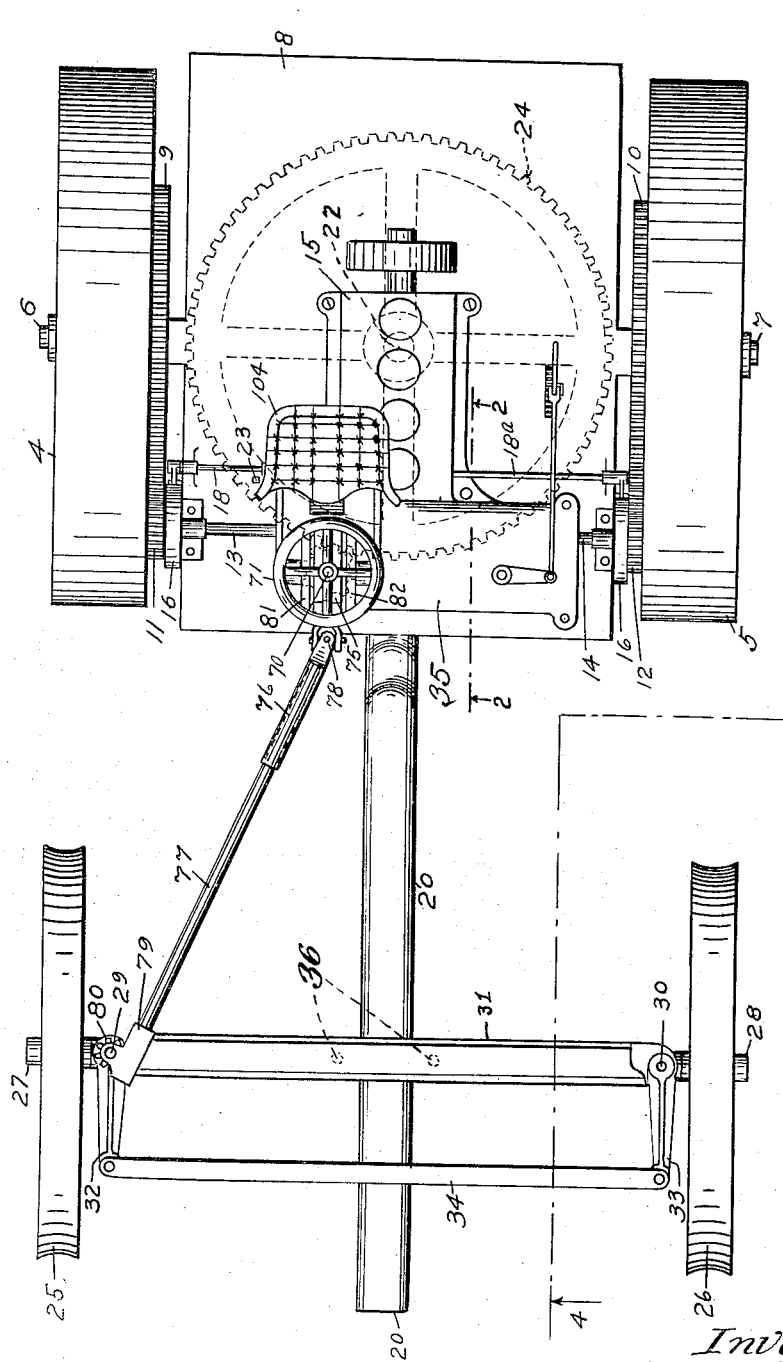

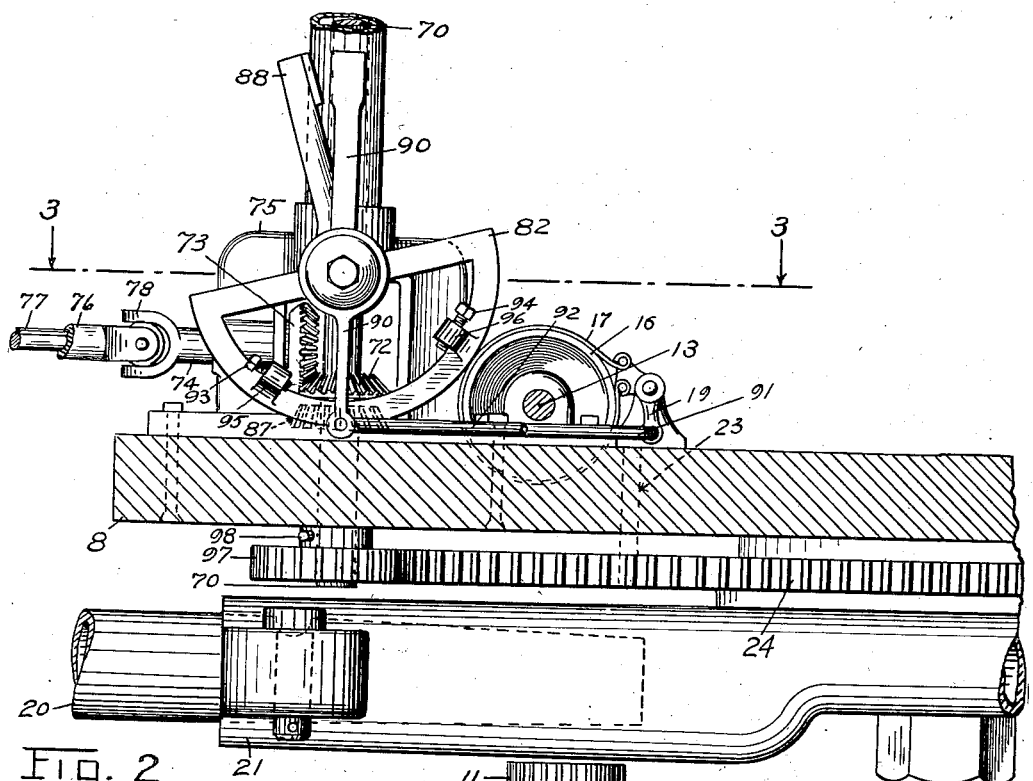

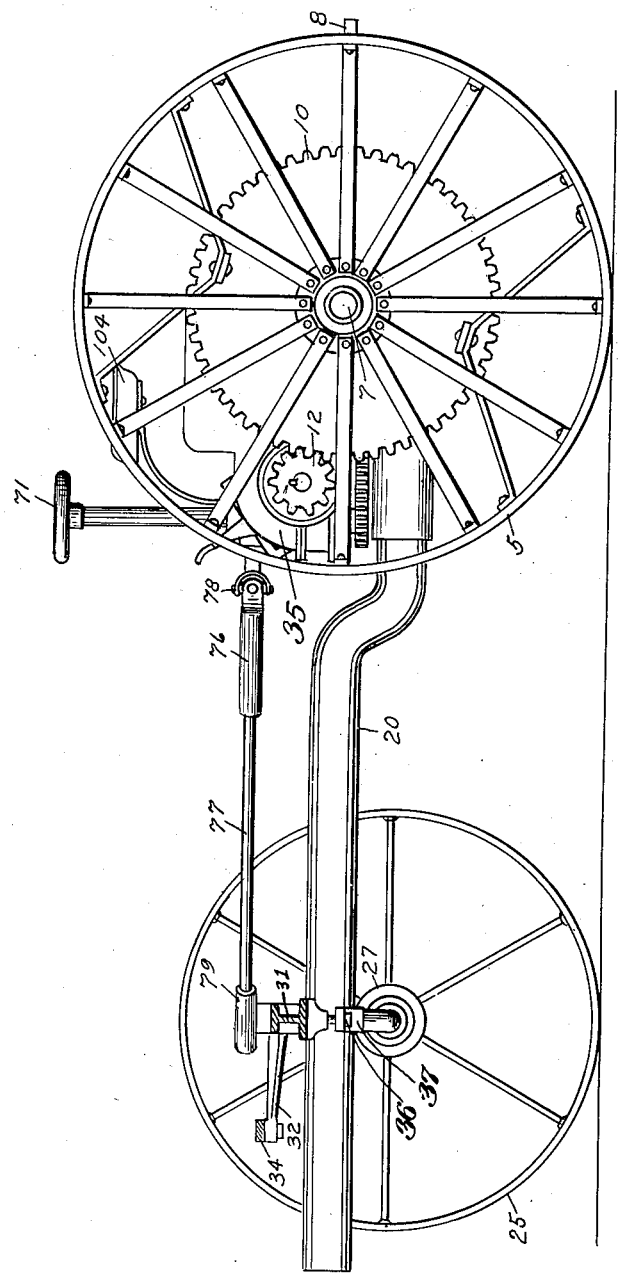

1,815,271

UNITED STATES PATENT OFFICE

ANDREAN G. RONNING AND ADOLPH RONNING, OF MINNEAPOLIS, MINNESOTA, ASSIGNORS, BY MESNE ASSIGNMENTS, TO ADOLPH RONNING, AND ADOLPH RONNING AND JACOB A. RONNING TRUSTEES OF ANDREAN G. RONNING, DECEASED, ALL OF MINNEAPOLIS, MINNESOTA

TRACTOR

Original application filed June 21, 1918, Serial No. 241,133. Divided and this application filed March 23, 1925. Serial No. 17,852.

This invention relates to tractors and the main object is to provide an improved tractor construction, including means of a novel and practical nature for controlling the direction of the machine whereby it may be steered around sharply and with the assistance of the engine or power unit of the tractor. Further and more specific objects will be disclosed in the course of the following specifications, reference being had to the accompanying drawings, wherein:

Figure 1 is a plan view of the machine.

Figure 2 is an enlarged partly longitudinal sectional view on the line 2—2 in Figure 1.

Figure 3 is a partial horizontal section on the line 3—3 in Figure 2, and,

Figure 4 is a partly sectional elevation, as on the line 4—4 in Figure 1.

This application is a division of application for patent for tractor cultivator Serial No. 241,133, filed by us on June 21, 1918, now Patent 1,535,439 dated April 28, 1925, reissued as Re. 16,352 May 18, 1926.

Referring to the drawings:—4—5 indicate traction wheels which are mounted on suitable spindles 6—7 at opposite sides of an intermediate platform 8, as shown in Figure 1. The traction wheels 4—5 are provided with gears 9—10, respectively, at their inner sides, with which mesh driving pinions 11—12, carried by alined shafts 13—14, which are connected by any suitable differential gearing, contained in the housing 35, and driven in any approved way from a motor 15, such as an internal combustion engine, mounted on the platform 8. The differential shafts 13—14 are also provided with brake drums 16, upon which are mounted brake bands 17, as best shown in Figures 2 and 3. Said brake bands are arranged to be operated to grip or release their respective drums by means of rock shafts 18—18ª, mounted at opposite sides of the platform 8 and having downwardly extending arms 19—19ª, by which said shafts may be rocked by mechanism which will be hereinafter more fully described. The arrangement is such that either of the driving pinions 11—12 may be separately braked to stop the traction wheel driven by it and thereby steer the machine by means of the traction wheels.

20 indicates a tubular reach pole or tongue the rear end of which is detachably fitted in a suitable socket in a tubular support 21, which is mounted underneath the platform 8 upon a central pivot 22. This reach pole is rotatably retained in the support by a removable pin which engages in an annular groove in the pole. The support 21 may in certain circumstances be held against rotation about its pivot by means of a bolt 23 which is adapted to extend through the platform 8 and engage a ring gear 24 secured to the support 21, as shown in Figure 2. The reach pole 20 extends upwardly and forwardly along the center line of the machine, and is rigidly secured by clamp bolts 36 and yoke piece 37 to the axle 31 of a front frame to which are connected the dirigible front wheels as hereinafter described, so that the reach pole forms a part of the frame of the machine as a whole, which frame is higher at the front to allow ample clearance below it for ground engaging implements.

25—26 indicate the front wheels which, as shown in Figure 1, are mounted upon spindles 27—28, which project laterally from vertical pivots 29—30, mounted in suitable bearings at the ends of the front axle 31. Said pivots are provided with forwardly extending bars 32—33, the front ends of which are connected by a cross bar 34 which holds the arms 32—33, and therefore the front wheels, in parallelism with each other. Obviously, by turning one of the pivots, as 29, both front wheels may be turned in one direction or the other to guide the machine.

70 indicates a steering shaft mounted in a vertical position at the forward portion of the platform 8 in advance of the engine 15, as shown in Figure 1. Said shaft is provided with a steering wheel 71 at its upper end so that it may readily be turned, and carries a bevelled gear 72, which meshes with a bevelled gear 73, mounted upon a horizontal shaft 74. Preferably the shafts 70 and 74 are both mounted in a suitable casting 75 secured upon the platform 8, as shown in Figure 2. 76—77 indicate the members of an extensible steering rod, by which the shaft 74 is operatively connected with the dirigible front wheels, said rod members being telescopically fitted together, as shown in Figure 1. The member 76 is connected with the shaft 74 by a universal coupling 78, and the member 77 is provided at its forward end with a worm 79, which engages a worm wheel 80, secured upon the pivot 29 of the dirigible wheel 25. Thus, by rotating the steering wheel 71, the steering rod members may be rotated, thereby rotating the worm 79 and the worm wheel 80, and turning the front wheels in one direction or the other to guide the machine. The telescopic construction of the members 76—77 permits the length of the steering rod to be varied, and also provides for readily disconnecting said members if and when the front steering carriage 20, 25, 26, is to be removed or disconnected from the power or traction unit proper, as, for instance, when a different type or construction of the front steering carriage is to be applied.

81—82 indicate segmental racks having hubs 83—84, which are mounted on pivots 85—86 projecting from opposite sides of the casting 75, as shown in Figure 3. Said racks mesh with opposite sides of a bevelled gear 87, mounted on the shaft 70 below the gear 72, as shown in Figure 2. Each of said racks is provided with an upwardly extending foot lever 88, as best shown in Figure 2, so that, by pressing on one or the other, of said foot levers, the rack with which it is connected may be rocked about its pivot, thereby rotating the gear 87, and through it rotating the shaft 70 and gear 72 to steer the front wheels. It will be evident therefore, that the operator may steer the machine either by turning the steering wheel 71 by hand, or by operating one or the other of the levers 88.

In conjunction with the steering of the machine effected by turning the front wheels, as described, provision is made for automatically braking one or the other of the traction wheels at the same time, to aid in the steering operation. For this purpose levers 89—90 are provided at opposite sides of the segmental racks 81—82, said levers being pivoted between their ends upon the hubs 83—84, as shown in Figure 3, and their lower ends being connected with the arms 19—19ª, of the rack shafts 18—18ª, at opposite sides of the machine by connecting rods 91—92, respectively, as shown in Figure 3. The arrangement is such that forward movement of the upper end of either of the levers 89—90 will apply the brake to the driving gear 11 or 12 at the opposite side of the machine, thereby retarding or stopping the traction wheel driven by such driving gear. This brake operated steering mechanism is not ordinarily used in guiding the machine along the corn rows, but is intended for use in making short turns, as at the ends of the field, and, therefore, it is arranged to be operated automatically only when the front wheels are turned sharply. For that purpose the segmental racks 81—82 are each provided with a pair of set screws 93—94, mounted in bosses 95—96 on the outer faces of said racks and at opposite sides of the lower ends of the levers 89—90, as shown in Figure 2. The arrangement is such that by rocking the racks 81—82, one or the other of the set screws 93—94 may be caused to engage the lower end of the levers 89—90, which lie between them, and thereby move said levers to set or release the brakes connected with them. The set screws 93—94 of each rack are set a sufficient distance apart so that the rack to which they appertain has a considerable range of movement without bringing said set screws into engagement with the lever lying between them, and one or the other set screw 94 is arranged to engage and operate the appropriate lever to set the brake connected with it only when the front wheels are turned to a sharp angle. The set screws 93 operate to release the brake that may have been set after the front wheels have been straightened up. Either or both of the brakes may, however, be set by hand independently of the operation of the front wheel steering devices by pulling back the upper ends of one or both of the levers 89—90.

Provision is also made for turning the traction wheels laterally with reference to the front frame in connection with the steering of the front wheels, to aid in guiding the machine. For this purpose the steering shaft 70 is provided at its lower end with a pinion 97 which meshes with the gear 24, as shown in Figure 2. By this construction when the steering wheel 71 is operated to turn the front wheels, for example to the left, the platform 8 and the traction wheels will be swung to the right about the pivot 22,—i. e.—in a clock-wise direction as viewed in Figure 1, thereby enabling the machine to make a short turn toward the left without turning the front wheels so sharply as to apply the brakes. If desired the platform 8 may be non-rotatably secured to the tongue 20 by passing the pin 23 through the platform into engagement with a suitable socket in the gear 24, as indicated by dotted lines in Figure 2, and by then disconnecting the pinion 97 from the shaft 70 by withdrawing the pin 98 as shown in Figure 2, the front wheels may be steered independently of the traction wheels. The pinion 97 then remains loose on said shaft, resting on the support 21.

It is understood that various modifications may be made in the general design and structural details, of the invention as herein illustrated and described, providing however, that such modifications come within the spirit and scope of the appended claims.

Having now therefore, fully shown and described our invention what we claim to be new and desire to protect by Letters Patent is:—

1. In a tractor, a frame; two traction wheels associated with said frame; driving mechanism through which said wheels are driven differentially, so that each may rotate slower than the other; steering mechanism independent of said driving mechanism whereby the tractor may be steered; two brake members associated one with each of said traction wheels; means for interrupting the operation of said steering mechanism; and means for connecting said steering mechanism with said brake members so that either may be applied independent of the other to the traction wheel with which it is associated.

2. In a tractor, a frame; traction wheels associated with said frame; two driving axles through which said traction wheels are driven; differential mechanism intermediate the inner ends of said driving axles and through which either, and the traction wheel associated therewith, may be driven independently of the other; driving mechanism acting through said differential mechanism to drive said traction wheels; two brake members associated one with each of said traction wheels; steering mechanism independent of said driving mechanism for steering the tractor; means for interrupting the operation of said steering mechanism; and means for applying either one of said brake devices to the exclusion of the other, to thereby retard the speed at which one or the other of said traction wheels is driven.

3. In a tractor, a main frame, means for propelling said tractor carried by said main frame; a sub-frame pivoted to the main frame, a manually operated steering member carried by said main frame, two sets of steering means for turning said tractor, one of said sets having means connected to both of said frames for moving one of said frames relative to the other and means for connecting and disconnecting either of said sets with said steering member, substantially as shown and described.

4. In a tractor, a main frame, a traction member at each side of said frame, differential mechanism between said members, propelling mechanism for said members, a rotatable steering member carried by said frame, a sub-frame pivoted adjacent to the front end of said main frame for supporting the rear end of said main frame, and means associated with said steering member and said propelling mechanism for turning said tractor, substantially as shown and described.

5. In a tractor, a main frame having traction members, a wheel supported secondary frame pivotally connected to the main frame, a steering mechanism mounted on the main frame, a telescoping power transmitting connection between said mechanism and the wheels of the secondary frame, for steering said wheels, and means actuated by operation of said steering mechanism for angling said frames with respect to each other to supplement the steering of said wheels in steering the tractor.

6. In a tractor, a main frame having laterally disposed traction members, a forwardly projecting frame pivoted at its rear end to the main frame on a vertical axis, dirigible wheels supporting the forwardly projecting frame, individual brakes for the respective traction members, and unitary steering control mechanism on the main frame including means for steering the dirigible wheels, means for angling the frames on the pivotal connection, and means for applying one of the brakes after predetermined movement of said wheels and frames.

7. In a tractor, the combination of a main frame having laterally disposed traction members, a forwardly extending reach member swivelled to the main frame on a horizontal axis, a cross-bar clamped to the forward portion of the reach member and supported on dirigible wheels, and actuating means connecting said wheels to a control device on the main frame including a telescopic shaft extending between the main frame and cross-bar.

8. In a tractor, a main frame supporting a motor, traction members supporting said frame and driven by the motor, a secondary frame supported on dirigible wheels, longitudinally extending connecting means between said frames consisting solely of a reach member detachably connected at its rear end to the main frame at a point below the level of said frame and extending upwardly and forwardly and connected at its forward end to the secondary frame, and means for angling the dirigible wheels including actuating means located on the main frame.

9. In a tractor, a main frame supporting a motor, a pair of parallel traction wheels supporting the frame and driven by the motor, a secondary frame supported on dirigible wheels, longitudinally extending connecting means between the frames consisting solely of a reach member detachably connected beneath the main frame on a central line between the traction wheels and formed to extend upwardly and forwardly to its connection with the secondary frame, and means for angling the dirigible wheels including actuating means located on the main frame.

In testimony whereof we affix our signatures.

ANDREAN G. RONNING.
ADOLPH RONNING.